(No Model.)
A. & D. BRAMER.
DISK HARROW OR CULTIVATOR.
No. 578,202. Patented Mar. 2, 1897.
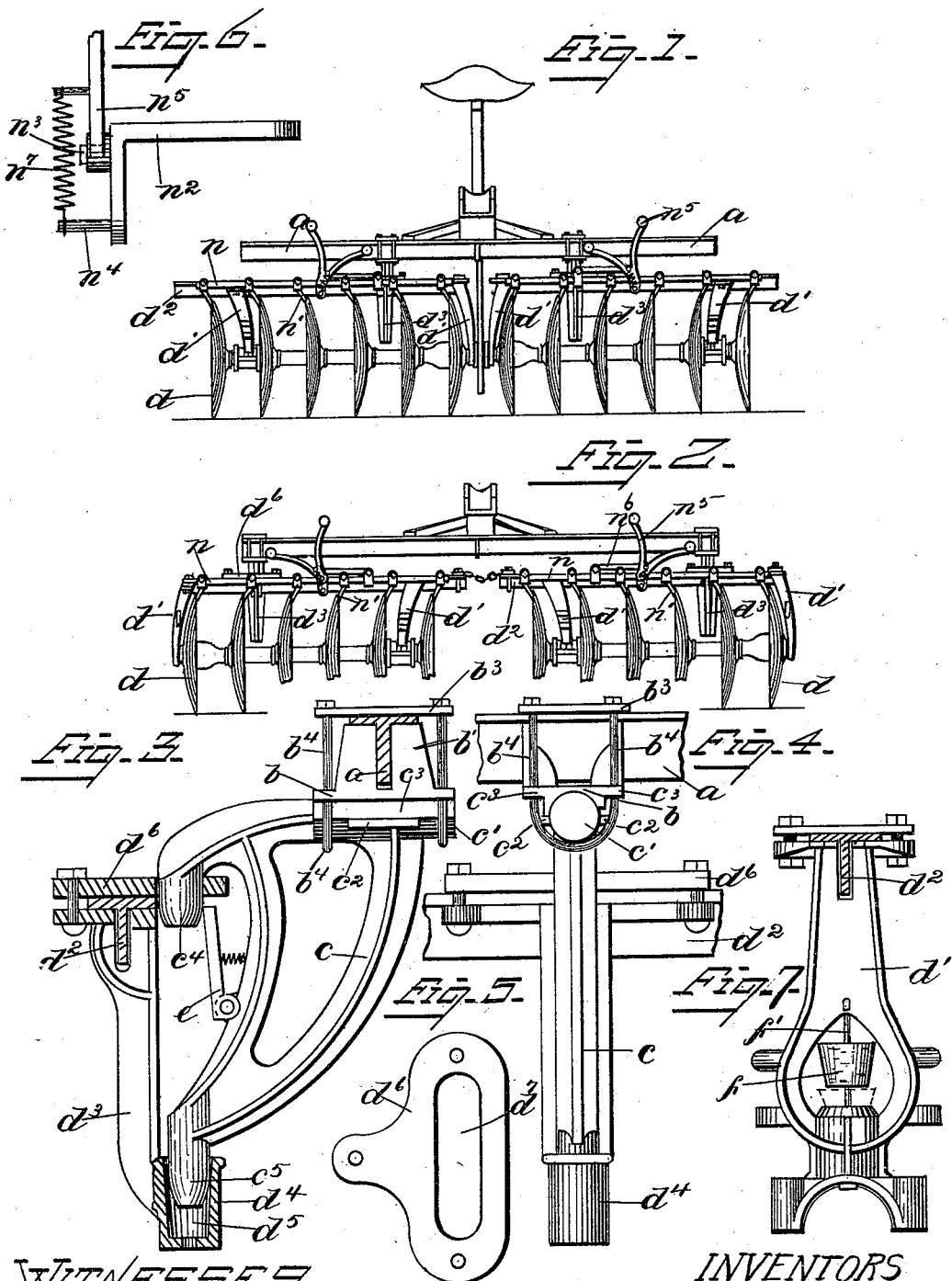
WITNESSES
Charles B Crocker
F. H. Davis
INVENTORS
Albert Bramer
David Bramer
by B. J. Noyes atty.

UNITED STATES PATENT OFFICE.

ALBERT BRAMER AND DAVID BRAMER, OF BOSTON, MASSACHUSETTS.

DISK HARROW OR CULTIVATOR.

SPECIFICATION forming part of Letters Patent No. 578,202, dated March 2, 1897.

Application filed November 1, 1895. Serial No. 567,781. (No model.)

*To all whom it may concern:*

Be it known that we, ALBERT BRAMER and DAVID BRAMER, of Boston, in the county of Suffolk and State of Massachusetts, have invented an Improvement in Disk Harrows or Cultivators, of which the following description, in connection with the accompanying drawings, is a specification, like letters on the drawings representing like parts.

This invention has for its object to improve the construction of disk harrows or cultivators, and the invention is shown embodied in a reversible harrow, or one wherein the disk gangs are interchangeable; and the invention consists in details of construction to be hereinafter set forth.

Figure 1 shows a rear side elevation of a disk harrow or cultivator embodying this invention, the disks being arranged to throw outward; Fig. 2, a similar view showing the disk gangs shifted from side to side, so that the disks will throw inward; Fig. 3, a detail of the connection by means of which the disk-gang frame is connected with the main frame; Fig. 4, an edge view of the connection shown in Fig. 3; Fig. 5, a detail showing the top plate of the hanger on the disk-gang frame which forms a coöperative part of the connection; Fig. 6, a detail of the foot-lever for operating the scrapers; Fig. 7, a detail of one of the bearing-supports for the disk-gang shaft, showing particularly the means for closing the oil-passage.

The main frame of the machine has as a coöperative part of it a cross-bar $a$, which may and preferably is made of T angle-iron, and it may be of any suitable length. Upon this cross-bar $a$ two couplings are placed, which are adapted to be moved along on the bar, and when near the middle of said bar to connect the disk gangs with the main frame in such manner that the disks throw outward, as shown in Fig. 1, and when at the extremities of said bar to connect the disk gangs with the main frame in such manner that the disks throw inward. These couplings are made substantially alike, and each consists of a block $b$, formed with two upright sides $b'$ $b'$, having a vertical groove or passage $b^2$, adapted to receive the vertical flange of the T-iron cross-bar $a$, and formed with flat upper ends adapted to receive upon them the horizontal portions of said T-iron cross-bar. (See Fig. 3.) These blocks therefore rest against the under side of the cross-bar $a$, and to hold them up in position plates $b^3$ are placed upon the top of said cross-bar, and U-shaped straps $b^4$ are made to embrace the lower projecting portions of the blocks and also portions of a bracket, to be described, the upper ends of said straps passing up through holes in said plates $b^3$ and screw-threaded to receive upon them suitable nuts. By tightening these nuts the straps $b^4$ are drawn up and the couplings are securely held in position, but by loosening them said couplings may be moved along the cross-bar as desired.

The under side of each coupling is formed with a semicircular groove running substantially in parallelism with the line of draft, and a bracket $c$ is provided, which is formed with a more or less circular upper end portion $c'$, adapted to enter said semicircular recess formed in the under side of the coupling, and the U-shaped straps $b^4$ embrace this portion of the bracket, thereby securing the bracket to the coupling in such manner that it may be moved with the couplings when desired. The bracket $c$ is formed with this circular portion $c'$ and is connected with the coupling in the manner above described to permit it to swing or rock on a horizontal axis in parallelism with the line of draft. A slight movement, however, is all that is required and this in but one direction—namely, inward. Hence a stop $c^2$ is formed on the bracket $c$ at each side of the circular end portion, and stops or abutments $c^3$ are formed upon the under side of the coupling at each side of the semicircular recess.

The stop or abutment at one side is below the stop or abutment on the other side, so that the brackets can swing freely a short distance in one direction only, its movement in the other direction being limited to a perpendicular position.

The disk gang comprises a shaft having thereon several disks $d$ and hangers $d'$ for the disk-gang shaft depending from a frame-bar $d^2$, made of T-iron. A hanger $d^3$ also depends from the T-iron frame-bar $d^2$, which, as represented in Fig. 3, is formed at its upper end with a vertical groove or recess to receive the vertical flange of the T-iron bar, and is also formed with a flat upper end to receive upon it the horizontal portion of said frame-bar, and said hanger has at its lower end a laterally or forwardly projecting portion $d^4$, having a more or less tapered socket $d^5$. To secure this hanger to the frame-bar $d^2$, a plate $d^6$ is placed upon the bar $d^2$, which is bolted to suitable flanges formed upon the hanger $d^3$. The plate $d^6$ has formed in it an elongated hole or passage $d^7$, (see Fig. 5,) which is located above the tapered socket $d^5$.

The bracket $c$ is formed with two lugs $c^4$ $c^5$, one above the other, the lug $c^4$ entering the elongated hole $d^7$ in the plate $d^6$ and the lug $c^5$ entering the tapered socket $d^5$.

By providing the bracket $c$ with lugs, as shown, the disk-gang frame may be easily removed or detached, and is free to turn on a vertical axis, the lugs serving as pivots, and by elongating the hole $d^7$ and tapering the socket $d^5$ the disk gang is permitted to rock or tilt to a certain extent and also move bodily inward a short distance.

To more securely hold the bracket and hanger together, we have provided a locking device consisting of a spring-pressed latch $e$, pivoted to the bracket $c$, the upper end of which passes beneath the plate $d^6$ and bears upon or against a lug $c^4$, so that said lug and spring-latch together form a snap-catch, as will be seen by referring to Fig. 3.

In one of the hangers $d'$, which support the disk-gang shaft, an oil well or passage is formed leading to the shaft, (see Fig. 7,) and to close said passage a stopper $f$ is provided, which is formed with a vertical hole through it, and a rod or wire $f'$ is attached to the hanger, passing through said stopper and serving as a guide upon which said stopper may slide. Stoppers arranged on a guide in this manner are not lost.

The scraper mechanism consists, essentially, of a scraper-bar $n$, having attached to it suitable scrapers $n'$, and a bracket $n^2$ is bolted to the frame-bar of the disk gang, having two lugs $n^3$ $n^4$, to one of which, as $n^3$, a bifurcated foot-lever $n^5$ is pivoted, which is connected by a link $n^6$ with a scraper-bar.

A spring $n^7$ is attached at one end to the foot-lever at a point a short distance above its pivot and is attached at its lower end to the lug $n^4$, said spring, by working back and forth across the pivot, acting to hold the foot-lever in either position that it may be set.

The bracket $n^2$ is secured to the frame-bar midway between the series of disks, so that the foot-lever is within reach of the driver notwithstanding shifting of the disk gangs, and, as will be seen, when so located one or the other arm of said lever will be engaged by the foot of the driver.

From the foregoing it will be seen that the disk gang may be easily removed and shifted from side to side, the coupling being moved along the cross-bar; also, that the disk gang may move bodily inward a short distance in a horizontal plane or may rock or tilt, owing to the peculiar way the bracket is connected, and that said disk gangs may also swing on a vertical axis.

We claim—

1. In a disk harrow or cultivator, a cross-bar, two couplings mounted on and adjustable along said cross-bar, brackets $c$ pivotally connected therewith to turn on horizontal axes, said brackets each having two downwardly-projecting lugs $c^4$, $c^5$, one above the other in alinement, two disk-gang frames each having a hanger provided with two recesses which receive said lugs $c^4$, $c^5$, substantially as described.

2. In a disk harrow or cultivator, the combination with two disk-gang frames, brackets $c$ to which they are pivotally connected, the T cross-bar $a$, couplings thereon each composed of a block $b$ formed with a vertical passage adapting it to fit the under side of said cross-bar, and also formed with a curved bearing-surface for said bracket $c$, a plate $b^3$ which rests upon said cross-bar, and U-shaped straps $b^4$ connecting said parts $b$, $b^3$, which also embrace and hold the brackets $c$ upon the bearing-surfaces provided for them, substantially as described.

3. In a disk harrow or cultivator, a main frame, two brackets $c$ pivotally connected therewith to turn on horizontal axes, stops to prevent said brackets from swinging outwardly or away from each other, each bracket having two downwardly-projecting lugs $c^4$, $c^5$, one above the other in alinement, and two disk-gang frames each having a hanger provided with recesses which receive said lugs, substantially as described.

4. In a disk harrow or cultivator, a main frame, two brackets $c$ pivotally connected therewith to turn on horizontal axes, each bracket having two downwardly-projecting lugs $c^4$, $c^5$, one above the other in alinement, two disk-gang frames each having a hanger provided with two recesses which receive said lugs $c^4$, $c^5$, the uppermost recess in each hanger being elongated to permit the disk gang to rock or tilt in addition to turning on a vertical axis, substantially as described.

5. In a disk harrow or cultivator, a main frame, two brackets $c$ pivotally connected therewith to turn on horizontal axes, each having two downwardly-projecting lugs $c^4$, $c^5$, one above the other in alinement, two disk-gang frames each having a hanger provided with two recesses which receive said lugs $c^4$, $c^5$, substantially as described.

6. In a disk harrow or cultivator, a main frame, two brackets $c$ depending therefrom, each having two downwardly-projecting lugs $c^4$, $c^5$, one above the other in alinement, two disk-gang frames each having a hanger provided with two recesses which receive said lugs $c^4$, $c^5$, on the brackets, the uppermost recess in each hanger being elongated to permit the disk gang to rock or tilt in addition to turning on a vertical axis, substantially as described.

7. In a disk harrow or cultivator, a main frame, two brackets depending therefrom each having two downwardly-projecting lugs, one above the other in alinement, two interchangeable disk-gang frames, each having a hanger with recesses which receive said lugs, and a locking device for said parts, substantially as described.

8. In a disk harrow or cultivator, a main frame, two brackets depending therefrom, each having two downwardly-projecting lugs, one above the other in alinement, two interchangeable disk-gang frames, each having a hanger with recesses which receive said lugs, and a spring-pressed latch $e$ pivoted to the bracket $c$ and bearing against the lug $c^4$, substantially as described.

9. In a disk harrow or cultivator, a main frame, two interchangeable disk gangs connected thereto, scrapers for the disks of said gangs, a scraper-bar to which they are attached, a bracket $n^2$ secured to the middle of the disk-gang frame-bar, having lugs $n^3$, $n^4$, a bifurcated foot-lever $n^5$ turning on the lug $n^3$, link $n^6$ connecting said foot-lever with the scraper-bar, and spring $n^7$ attached at one end to the foot-lever at a point above the lug $n^3$, and attached at its other end to the lug $n^4$, substantially as described.

In testimony whereof we have signed our names to this specification in the presence of two subscribing witnesses.

ALBERT BRAMER.
     DAVID BRAMER.

Witnesses:
 ARTHUR N. MACOMBER,
 FRED J. FORDHAM.